No. 738,590. PATENTED SEPT. 8, 1903.
J. B. YEAGLEY.
DRAFT EQUALIZER.
APPLICATION FILED AUG. 3, 1903.
NO MODEL.
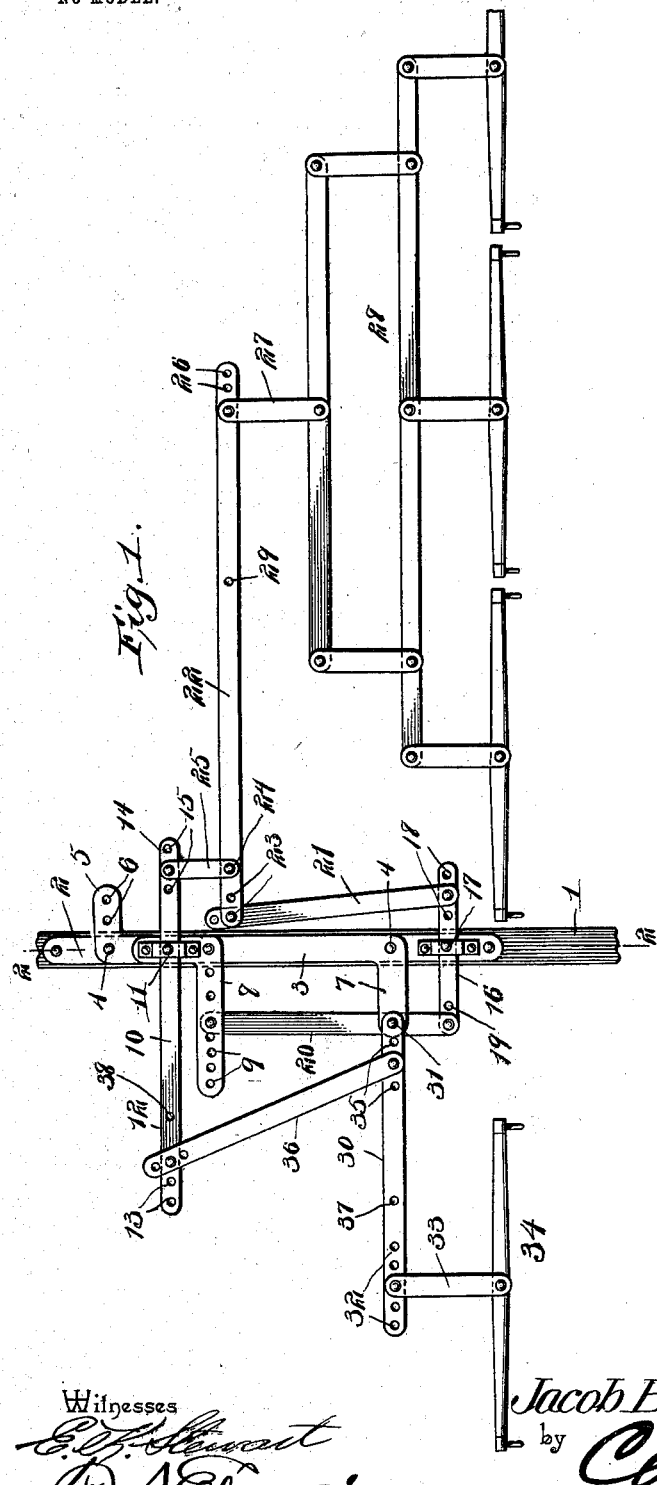
Witnesses
Jacob Bloom Yeagley, Inventor.
by
Attorneys No. 738,590. Patented September 8, 1903.

UNITED STATES PATENT OFFICE.

JACOB BLOOM YEAGLEY, OF INDIANAPOLIS, INDIANA.

DRAFT-EQUALIZER.

SPECIFICATION forming part of Letters Patent No. 738,590, dated September 8, 1903.

Application filed August 3, 1903. Serial No. 168,078. (No model.)

*To all whom it may concern:*

Be it known that I, JACOB BLOOM YEAGLEY, a citizen of the United States, residing at Indianapolis, in the county of Marion and State of Indiana, have invented a new and useful Draft-Equalizer, of which the following is a specification.

My invention relates to draft-equalizers, and has for its object to produce a device of this character of comparatively simple construction in which the draft between a single horse upon one side of the pole and two or more horses upon the other side may be perfectly equalized and side draft eliminated, one in which the device may be readily changed to right or left hand for use in connection with right or left hand harvesters, whereby the single horse will at all times be upon the grain side, and one in which the single horse will be brought sufficiently close to the pole to obviate walking in the grain when harvesting or upon the fallowed land when plowing.

To these ends the invention comprises the novel details of construction and combination of parts more fully hereinafter described.

In the accompanying drawings, Figure 1 is a plan view of an equalizer embodying my invention. Fig. 2 is a vertical sectional view on the line 2 2 of Fig. 1. Fig. 3 is a detail view.

Referring to the drawings, 1 indicates a tongue or pole of any suitable construction and material, to the upper face of which is attached in accordance with my invention a base-plate 2, secured in place by bolts or otherwise.

3 is a lever, herein termed the "draft" or "balance" lever, secured to the base-plate 2 by bolts 4. This lever, which overlies the base-plate and extends parallel with the same and the pole, is provided at its rear end with a laterally-extending portion or arm 5, which projects to the left of the pole and has a series of perforations 6 for the attachment of a hitching-link or the like (not shown) and at its forward end with a similar arm or portion 7, extending upon the right of the pole.

8 indicates an L-shaped bar or member, herein termed the "equalizing-lever," one arm of which is disposed above the balance-lever 3, adjacent to its rear end and bolted or otherwise secured thereto, while the other arm of the lever 8 projects to the right of the pole and is provided at its outer end with a plurality of perforations 9.

10 is a main draft-lever which is pivoted between its ends to the pole by means of a king-bolt 11, extending vertically through the same and also through the levers 3 and 8. The lever 10, which is disposed transversely of the tongue, has its pivotal point disposed between its longitudinal center and one end, thereby forming upon the right of the pole a long arm 12, provided at its outer end with a series of perforations 13, and upon the opposite side a short arm 14, having at its outer end a series of perforations 15.

16 is a balance-bar pivoted at its longitudinal center adjacent to the forward end of the base-plate 2 by means of a bolt 17. This bar is disposed transversely of the tongue to project upon opposite sides thereof and is provided at its left-hand end with a series of perforations 18 and at its right hand with a number of perforations 19, one of which receives the pivotal connecting-bolt for attaching to the bar the forward end of a connecting-link 20, the rear end of which is pivotally attached to the outer end of the equalizing-lever 8 by means of a bolt engaging one of the perforations 9.

21 is a connecting-link pivoted at its forward end to the left-hand end of bar 16 by means of a bolt engaging one of the perforations 18. This link is pivoted at its rear end to the inner end of a primary draft-lever 22 by means of a bolt engaging one of a series of perforations 23, with which the lever is provided. The lever 22 is pivoted adjacent to its inner end, as at 24, to the forward end of a strap 25, which extends parallel with the tongue and is in turn pivoted at its rear end to the arm 14 of main draft-lever 10 by means of a bolt engaging one of the perforations 15. The lever 22 is pivoted at a point adjacent to its inner end and is provided at its outer end with a series of perforations 26, one of which receives the connecting-bolt for attaching to the lever the strap 27 of a whiffletree 28. The lever is also provided at a point suitably remote from its outer end with a perforation 29, the purpose of which will hereinafter appear.

30 is a secondary draft-lever pivoted at its inner end, as at 31, to the outer end of the laterally-extended portion 7 of lever 3 and provided adjacent to its outer end with a series of perforations 32, one of which receives the attaching-bolt of a connecting-strap 33, carrying a swingletree 34. The lever 30 is provided at its inner end with a series of perforations 35, one of which receives the pivoting-bolt for attaching to the lever the forward end of a connecting-link 36, the rear end of which is pivotally connected to the long arm 12 of draft-lever 10 by means of a bolt engaging one of the perforations 13. The lever 30 is also provided at a point remote from its outer end with a perforation 37, the purpose of which will hereinafter appear.

In practice the pull exerted by the three horses upon the outer end of primary draft-lever 22 will be communicated through link 21 to the balance-bar 16 and thence through link 20 to equalizing-lever 8, while at the same time such pull will be transmitted, through strap 25, to the shorter arm of the main draft-lever 10. Pull exerted by the single horse upon the outer end of secondary lever 30 will be transmitted, through link 36, to the longer arm 12 of main draft-lever 10, and the various parts are so proportioned and pivoted relatively that the amount of pull exerted upon the arms 12 and 14, respectively, of lever 10 will be equalized at its pivotal point 11, while at the same time the power transmitted through link 21, balance-bar 16, and link 20 to equalizing-lever 8 will be sufficient to overcome the tendency of the three animals to swing the pole to the right against the single animal, and will thus eliminate side draft. By changing the pivotal bolts of the various connecting-links toward or from the pivotal centers of the various levers the relative power exerted by the animals upon opposite sides of the pole may be variously modified and regulated.

I have herein shown the device as arranged for equalizing the draft between three horses on the one side and one on the other; but the same may be readily changed to adapt it for two horses on the one side instead of three by moving the connecting-strap 27 inward to perforation 29 upon the lever 22 and changing the rear end of link 21 for connection with the inner end of said lever at the point of the second perforation 23 and by also changing the pivotal point of strap 33 to the perforation 37 upon lever 30 and the pivotal connection of link 36 at its rear end to perforation 38 upon lever 10. I have also shown the device as adapted for right-hand harvesters, in which the single horse will walk upon the right-hand side of the pole, but the same may be readily changed for use with a left-hand harvester by removing bolts 4 and 11 and turning the mechanism directly over upon the tongue, as will be readily understood. I have also shown the parts 3 and 8 as formed separately; but it will be understood that they may be cast or otherwise formed in a single piece and still subserve the same functions and that this and other like minor changes which may be made in the details of construction herein shown and described will not amount to a departure from the spirit or scope of my invention, which is not confined to the form, proportions, and exact manner of assemblage of the parts as herein set forth.

To demonstrate the manner in which the device equalizes the draft between three horses on the one side and one on the other, we will suppose that each horse pulls a hundred pounds and that the distance between the pivotal point 24 of primary lever 22 and the point of attachment thereto of the whiffletree is six times as great as the distance between said pivotal point and the point of connection of link 21 with the lever. Thus the lever will exert a pull of eighteen hundred pounds upon the balance-bar 16, through the medium of link 21, and this eighteen hundred pounds, with the three hundred pounds weight added, will amount to a total of two thousand one hundred pounds weight exerted upon the outer end of arm 12 of lever 10, and supposing the distance between the pivotal point 11 of said lever and the point thereon at which such pull is exerted is upon a ratio of six there will be a total of twelve thousand six hundred pounds pull upon said lever by the three horses to be balanced by the single horse. If now the distance between the point of connection of link 36 with secondary lever 30 and the point of attachment to said lever of the swingletree is eight times as great as the distance between said point of attachment and the inner end of the lever, there will be exerted by said lever a pull of eight hundred pounds plus one hundred pounds weight, making a total of nine hundred pounds exerted through the link 36 upon the outer end of the longer arm 12 of lever 10, and supposing the ratio between the point of connection of link 36 with lever 10 and the pivotal point of the latter to be fourteen the nine hundred pounds will be multiplied by fourteen, thus producing a total of twelve thousand six hundred pounds pull at said pivotal point by the single horse, thus equalizing the draft with the three horses. It is also to be especially noted that the tendency of the three horses to swing the pole to the right is obviated owing to the eighteen hundred pounds pull exerted upon the left-hand end of balance-bar 16 being transferred to and exerted upon the right of the pole through the medium of link 20, which connects the left-hand end of the balance-bar with the equalizer-bar 8, and that if the distance between the pole and the point of connection of the link with equalizer-bar is upon a ratio of three this weight will be multiplied to five thousand four hundred pounds counterweight exerted to eliminate the side draft. It is also to be noted that this weight may be increased or diminished, as circumstances require, by adjusting the end of link 20 outward or inward upon the equalizer-bar and also by changing connecting-links 20 and 21, one inward and the other outward, as the case may be, on balance-bar 16, thus dividing, respectively, the angular position of the two said connecting-links on each side of the tongue. It will also be noted that all the different parts of the structure are connected to the members 2 and 3, so that the whole device may be bodily disconnected from the tongue member 1 and remain intact. By this means the device may be transferred from one machine to another or manufactured and sold as an attachment to side-draft implements of various kinds and attached by the purchaser as required. This is an important feature of the invention and adds materially to its value and efficiency.

Having thus described my invention, what I claim is—

1. In a draft-equalizer, the combination with a vehicle tongue or pole, of a main draft-lever pivotally connected therewith, an equalizer-bar associated with the pole, a primary draft-lever connected with one end of the main lever and carrying means for the attachment of a plurality of draft-animals, a secondary draft-lever pivotally connected with the pole and carrying means for the attachment of a draft-animal, a connecting-link disposed between the outer end of the main lever and the inner end of the secondary lever, a balance-bar pivotally connected with the pole, a connecting-link disposed between one end of said bar and the primary lever, and a second connecting-link disposed between the other end of the bar and the equalizer-bar.

2. In a draft-equalizer, the combination with a vehicle tongue or pole, of a main draft-lever pivotally connected therewith, an equalizer-bar associated with the pole, a primary draft-lever pivotally connected with the main lever, and carrying means for the attachment of a plurality of draft-animals, a secondary draft-lever pivotally connected with the pole and carrying means for the attachment of a draft-animal, a connecting-link disposed between the outer end of the main lever and the inner end of the secondary lever and adjustably secured to each, a balance-bar pivotally connected with the pole a connecting-link disposed between one end of said bar and the primary lever and adjustably attached to each, and a second connecting-link disposed between the other end of the bar and the equalizer-bar and adjustably attached to each.

3. In a draft-equalizer, a base-plate adapted for attachment to a tongue or pole, a draft and balance lever carried by said base-plate, a main draft-lever pivotally connected with said balance-lever, an equalizer-bar associated with the balance-lever and base-plate, and a primary draft-lever connected with one end of the main lever and carrying means for the attachment of a plurality of draft-animals, a secondary draft-lever pivotally connected with said balance-lever and carrying means for attachment to a draft-animal, a connecting-link disposed between the outer end of the main lever and the inner end of the secondary lever, a balance-bar pivotally connected with the balance-lever, a connecting-link disposed between one end of said bar and the primary lever, and a second connecting-link disposed between the other end of the bar and the equalizing-bar.

In testimony that I claim the foregoing as my own I have hereto affixed my signature in the presence of two witnesses.

JACOB BLOOM YEAGLEY.

Witnesses:
RAY LAMOREE,
WILLIS K. YEAGLEY.